Patented July 18, 1950

2,515,936

UNITED STATES PATENT OFFICE 2,515,936

SILVER-CONTAINING PHOTOSENSITIVE GLASS

William Houston Armistead, Jr., Corning, N. Y., assignor to Corning Glass Works, Corning, N. Y., a corporation of New York No Drawing. Application December 8, 1943, Serial No. 513,441

12 Claims. (Cl. 49—92)

This invention relates to photosensitive glass, that is, glass in which exposure to short wave radiations such as ultra-violet brings about a change in the glass as a result of which irradiated areas are capable of heat developed coloration while non-irradiated areas remain substantially unchanged on heating. It has recently been shown that certain copper-containing glasses, when melted under proper reducing conditions, possess photosensitive characteristics. The latter glass produces only red as a permanent color.

The primary object of this invention is to provide an improved photosensitive glass.

Another object is to provide a photosensitive glass capable of developing a different color than those of prior photosensitive glasses.

Another object is to provide a photosensitive glass which is capable of developing a yellow or amber color.

Another object is to provide a photosensitive glass which contains silver as a sensitizing agent.

I have discovered that photosensitive glasses can be produced by incorporating a silver salt, such as silver chloride or silver sulfide, in an amount of about 0.05% to 0.3% computed as AgCl on the oxide basis, in batches equivalent to the general glass composition 75% $SiO_2$, 15% alkali metal oxide and 10% divalent metal oxide. The presence or absence of oxidizing agents is immaterial, but the presence of reducing agents should be avoided. Either potash or soda may be used as the alkali metal oxide. Practically any divalent metal oxide which will form colorless silicate glasses may be used, such as oxides of the metals of the second periodic group, lead oxide, etc. If desired, boric oxide may be present in amounts not exceeding about 10% provided the alkali content is high, say at least 15%. With low alkali contents, boric oxide tends to destroy photosensivity of the glass. 2% or more of alumina may also be present if the alkali content is not too low. In general, materials having strong ultra-violet absorption should be absent because they tend to inhibit photosensitivity by preventing penetration of the glass by the active radiations. Although the above mentioned general composition is preferred, any other proportions may be employed which do not make the glass too hard to melt or too unstable for the purpose in view. A glass composed of silica, alkali metal oxide and zinc oxide and containing about 0.1% $Ag_2S$ is particularly photosensitive.

As examples illustrating glass compositions suitable for use according to my invention, the following batches in parts by weight are given:

| | 1 | 2 | 3 | 4 | 5 | 6 | 7 | 8 | 9 |
|---|---|---|---|---|---|---|---|---|---|
| $SiO_2$ | 100 | 100 | 100 | 100 | 100 | 100 | 100 | 100 | 100 |
| $Na_2CO_3$ | 43 | ---- | 30 | 38 | 34 | 34 | 34 | 34 | 30 |
| $K_2CO_3$ (85%) | ---- | 44 | ---- | ---- | ---- | ---- | ---- | ---- | ---- |
| ZnO | 14 | 14 | 13 | 17 | ---- | ---- | ---- | ---- | ---- |
| $CaCO_3$ | ---- | ---- | ---- | ---- | 24 | ---- | ---- | ---- | ---- |
| $Cd(OH)_2$ | ---- | ---- | ---- | ---- | ---- | 15 | ---- | ---- | ---- |
| $BaCO_3$ | ---- | ---- | ---- | ---- | ---- | ---- | 17 | ---- | 17 |
| PbO | ---- | ---- | ---- | ---- | ---- | ---- | ---- | 13 | ---- |
| $Ag_2S$ | .14 | .14 | ---- | .28 | .14 | .14 | .14 | .14 | ---- |
| AgCl | ---- | ---- | .14 | ---- | ---- | ---- | ---- | ---- | .14 |
| $NaNO_3$ | ---- | ---- | 7 | ---- | ---- | ---- | ---- | ---- | 7 |
| $CeO_2$ | ---- | ---- | .05 | ---- | ---- | ---- | ---- | ---- | .05 |
| $SnO_2$ | ---- | ---- | ---- | .28 | ---- | ---- | ---- | ---- | ---- |
| $Na_2SiF_6$ | ---- | ---- | 1.3 | ---- | ---- | ---- | ---- | ---- | 1.3 |
| Gold | ---- | ---- | ---- | ---- | ---- | ---- | ---- | ---- | .014 |

It will be noted that batch 3 contains a small amount of cerium. I have found that the introduction of a small amount of cerium, preferably not over 0.05% $CeO_2$ on the oxide basis, intensifies the sensitivity of the glasses to the effective radiations and increases the color contrast between the exposed and unexposed areas. Increasing the amount of cerium above the optimum causes a decrease in the photosensitivity of the glass.

Tin which is present in batch 4 also intensifies the coloration of the glass when heated and assists the contrast if not present in an excess. About 0.2% $SnO_2$ on the oxide basis is sufficient to produce these effects. An excessive amount of tin destroys the photosensivity by causing uniform coloration or "warming in" when the glass is heated.

I have found that when a small amount of gold, say about 0.01% to 0.03% Au on the oxide basis, preferably in the form of gold chloride, is added to the batch for my silver-containing glass, in accordance with the teaching of the application of S. D. Stookey, Serial No. 513,443, filed concurrently herewith, the color which develops on heating is a combination of the red color due to gold and the yellow color due to silver. For example, batch 9 contains both silver and gold and yields a glass in which, after being irradiated and heated, the exposed areas have an orange color and the unexposed areas are substantially colorless.

Generally speaking, the extent of the irradiation and reheating that are necessary for the development of color in my glasses, will vary depending upon the source of the radiations, the composition of the glass and other factors. Hence the times, intensities and temperatures suitable for a particular glass are best determined by trial. In general, however, the exposure time at eight inches from a 25 ampere carbon arc will vary from about ten minutes to one hour or more and the reheating will require from one to three hours at about 470° to 500° C. For example, when the glass resulting from melting batch 3 was exposed, as above stated, for forty minutes through a photographic negative and subsequently reheated for three hours at about 500° C., a strong photographic image was formed in the glass having a dense yellow or amber color against a colorless background.

Ultraviolet lamps, such as the carbon arc or the quartz mercury arc, are convenient sources of radiations effective for my purpose. X-rays, radioactive radiations, etc., are also effective, and it is my intention that treatment with these radiations shall be included within the scope of the present invention.

The term "silicate glass," as used in the claims, means a glass prepared by fusion of raw glass-making materials under non-reducing conditions containing, on the oxide basis, a major proportion of silica, a minor proportion of an alkali metal oxide such as sodium oxide or potassium oxide, and a minor proportion of an oxide of a divalent metal such as the metals of the second periodic group and lead, and optionally containing one or more other conventional glass-forming oxides such as $B_2O_3$ and $Al_2O_3$ but being free of constituents which inhibit photosensitivity including materials having strong ultraviolet absorption and also over 10% $B_2O_3$ and over 2% $Al_2O_3$.

I claim:

1. A photosensitive glass consisting essentially of a silicate glass containing, on the oxide basis by weight, 0.05% to 0.3% of silver computed as AgCl, and $CeO_2$ in an amount up to 0.05%.

2. A photosensitive glass consisting essentially of a silicate glass containing, on the oxide basis by weight, 0.05% to 0.3% of silver computed as AgCl, and 0.01% to 0.03% of gold computed as Au.

3. A photosensitive glass consisting essentially of a silicate glass containing, on the oxide basis by weight, 0.05% to 0.3% of silver computed as AgCl, 0.01% to 0.03% of gold computed as Au, and $CeO_2$ in an amount up to 0.05%.

4. A photosensitive glass consisting essentially of a silicate glass containing, on the oxide basis by weight, 0.05% to 0.3% of silver computed as AgCl, and $SnO_2$ in an amount up to 0.2%.

5. An article comprising a body of irradiated, substantially colorless photosensitive glass consisting essentially of a silicate glass containing, on the oxide basis by weight, 0.05% to 0.3% of silver computed as AgCl, said glass body containing within its mass a predetermined latent photographic image capable of being developed, by uniform heating of the entire glass body, into a visible, colored image exhibiting photographic detail.

6. An article comprising a body of irradiated, substantially colorless photosensitive glass consisting essentially of a silicate glass containing, on the oxide basis by weight, 0.05% to 0.3% of silver computed as AgCl, and $CeO_2$ in an amount up to 0.05%, said glass body containing within its mass a predetermined latent photographic image capable of being developed, by uniform heating of the entire glass body, into a visible, colored image exhibiting photographic detail.

7. An article comprising a body of irradiated, substantially colorless photosensitive glass consisting essentially of a silicate glass containing, on the oxide basis by weight, 0.05% to 0.3% of silver computed as AgCl, and $SnO_2$ in an amount up to 0.2%, said glass body containing within its mass a predetermined latent photographic image capable of being developed, by uniform heating of the entire glass body, into a visible, colored image exhibiting photographic detail.

8. An article comprising a body made of a photosensitive glass consisting essentially of a silicate glass containing, on the oxide basis by weight, 0.05% to 0.3% of silver computed as AgCl, selected portions of said glass body being colored by the silver to form within its mass a heat-stable image exhibiting photographic detail.

9. An article comprising a body made of a photosensitive glass consisting essentially of a silicate glass containing, on the oxide basis by weight, 0.05% to 0.3% of silver computed as AgCl, and $CeO_2$ in an amount up to 0.05%, selected portions of said glass body being colored by the silver to form within its mass a heat-stable image exhibiting photographic detail.

10. An article comprising a body made of a photosensitive glass consisting essentially of a silicate glass containing, on the oxide basis by weight, 0.05% to 0.3% of silver computed as AgCl, and 0.01% to 0.03% of gold computed as Au, selected portions of said glass body being colored by the silver to form within its mass a heat-stable image exhibiting photographic detail.

11. An article comprising a body made of a photosensitive glass consisting essentially of a silicate glass containing, on the oxide basis by weight, 0.05% to 0.3% of silver computed as AgCl, 0.01% to 0.03% of gold computed as Au, and $CeO_2$ in an amount up to 0.05%, selected portions of said glass body being colored by the silver to form within its mass a heat-stable image exhibiting photographic detail.

12. An article comprising a body made of a photosensitive glass consisting essentially of a silicate glass containing, on the oxide basis by weight, 0.05% to 0.3% of silver computed as AgCl, and $SnO_2$ in an amount up to 0.2%, selected portions of said glass body being colored by the silver to form within its mass a heat-stable image exhibiting photographic detail.

WILLIAM HOUSTON ARMISTEAD, JR.

REFERENCES CITED

The following references are of record in the file of this patent:

UNITED STATES PATENTS

| Number | Name | Date |
|---|---|---|
| 332,294 | Shirley | Dec. 15, 1885 |
| 337,170 | Libbey | Mar. 2, 1886 |
| 343,823 | Libbey | June 15, 1886 |
| 366,364 | Atterbury | July 12, 1887 |
| 703,512 | Zsigmondy | July 1, 1902 |
| 1,169,571 | Rosenthal | Jan. 25, 1916 |
| 1,271,652 | Bellamy | July 9, 1918 |
| 1,475,573 | Drescher | Nov. 27, 1923 |

(Other references on following page)

UNITED STATES PATENTS

| Number | Name | Date |
|---|---|---|
| 1,899,230 | Crowell | Feb. 28, 1933 |
| 2,049,765 | Fischer | Aug. 4, 1936 |
| 2,237,042 | Truby | Apr. 1, 1941 |
| 2,241,950 | Huniger et al. | May 13, 1941 |
| 2,306,626 | Huniger et al. | Dec. 29, 1942 |
| 2,326,012 | Dalton | Aug. 3, 1943 |
| 2,422,472 | Dalton | June 17, 1947 |

FOREIGN PATENTS

| Number | Country | Date |
|---|---|---|
| 107,998 | Australia | 1939 |
| 109,317 | Australia | 1939 |

OTHER REFERENCES

Ceramic Industry, Jan. 1944, page 72.